United States Patent [19]
Dusza et al.

[11] 3,882,149
[45] May 6, 1975

[54] SUBSTITUTED BENZOFURANYL ETHYLIDENE CARBAZIC ACID ESTERS

[75] Inventors: John Paul Dusza, Nanuet; Harry Lee Lindsay, Pearl River; Seymour Bernstein, New City, all of N.Y.

[73] Assignee: American Cyanamid Company, Stamford, Conn.

[22] Filed: Dec. 17, 1973

[21] Appl. No.: 425,423

[52] U.S. Cl. .......................... 260/346.2 R; 424/285
[51] Int. Cl. .............................................. C07d 5/42
[58] Field of Search ............................. 260/346.2 R

[56] References Cited
OTHER PUBLICATIONS

Avramovici et al., Chem. Abstracts, Vol. 79, (1973), 18306.

*Primary Examiner*—Henry R. Jiles
*Assistant Examiner*—Bernard I. Dentz
*Attorney, Agent, or Firm*—Ernest Y. Miller

[57] ABSTRACT

The preparation and method of use of substituted benzofuranyl ethylidene carbazic acid esters having antirhinoviral activity, is described.

3 Claims, No Drawings

SUBSTITUTED BENZOFURANYL ETHYLIDENE CARBAZIC ACID ESTERS

DESCRIPTION OF THE INVENTION

This invention is concerned with novel substituted benzofuranyl ethylidene carbazic acid esters and method of use as antirhinoviral agents.

In particular, this invention relates to compounds of the formula:

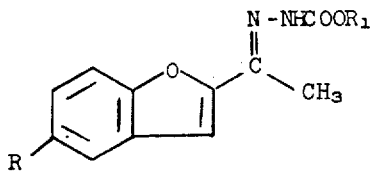

wherein R is selected from the group consisting of hydrogen and chlorine and $R_1$ is alkyl $C_1$-$C_4$.

The compounds of the present invention may be prepared by methods which can be graphically illustrated as follows:

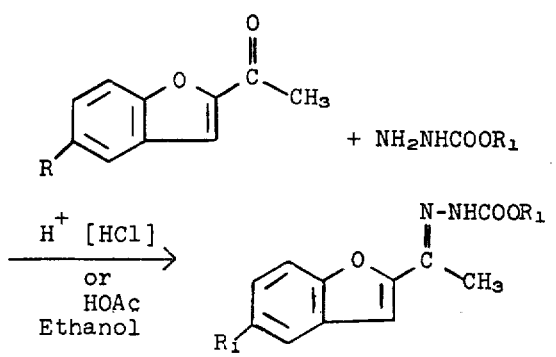

wherein R is selected from the group consisting of hydrogen and chlorine and $R_1$ is alkyl $C_1$-$C_4$. Among the specific compounds which can be prepared by the above method, are for example: 3-[1-(2-benzofuranyl)ethylidene]-carbazic acid ethyl ester, 3[-1-(5-chloro-2-benzofuranyl)ethylidene]-carbazic acid ethyl ester, 3-[1-(5-chloro-2-benzofuranyl)ethylidene]carbazic acid propyl ester, 3-[1-(2-benzofuranyl)ethylidene]carbazic acid t-butyl ester.

The compounds of the present invention exhibit antiviral activity against a variety of rhinoviruses. The following method is used to determine the anti-rhinoviral activity of the present compounds. Confluent monolayers of a continuous cell-line such as HeLa, HEp-2, KB or L-132 grown in plastic tissue culture dishes were infected with one of the viruses causing respiratory illness such as the "common cold." These viruses include members of the picornavirus group including the rhinoviruses, for example, types 1B, 2, 5, 14 or 23 and including the enteroviruses, for example, Coxsackie A-15 or A-21. Protection of the tissues to the cytopathic effects of the viruses was ascertained by means of a plaque inhibition test in which the test compound was adsorbed into a filter paper disc and placed on the agar used to overlay the infected cell monolayers, or by incorporation into the said agar overlay. The agar overlay medium used for this purpose was of the following formulation:

Minimum Essential Medium (Eagles) containing Earle's Salts (Grand Island Biological Company, Grand Island, N.Y.) and to which has been added:

| | |
|---|---|
| Ionagar No. 2 | 0.4% |
| Diethylaminoethyl dextran | 0.01% |
| Magnesium chloride | 0.06% |
| Fetal calf serum | 2% (v/v) |

The virus-infected cell monolayers plus test compound were incubated for 3 to 5 days in a humidified atmosphere of 5 percent carbon dioxide at either 33° or 37°C., depending on the virus. The ability of this compound to protect tissues from destruction by the viruses was then evident after staining the residual, uninfected cells with 0.5 percent crystal violet in 20 percent ethanol.

A summary of the results obtained in testing a representative compound is shown in Table I.

TABLE I

| Compound | Rhinovirus | | | | |
|---|---|---|---|---|---|
| | 1B | 2 | 5 | 14 | 23 |
| 3-[1-(2-Benzofuranyl)ethylidene]-carbazic acid ethyl ester | + | + | + | | + |

+ = Protects tissue against destruction by virus.

In addition, the compound 3-[1-(2-benzofuranyl)ethylidene]-carbazic acid ethyl ester is active in providing protection against Coxsackie A-21 virus.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene-maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warmblooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The following examples describe in detail the preparation of the compounds of this invention.

EXAMPLE 1

Preparation of
3-[1-(2-Benzofuranyl)ethylidene]-carbazic acid ethyl ester

A mixture of 4.0 gm. of 2-acetylbenzofuran and 4.0 gm. of ethyl carbazate in 200 ml. of a mixture of 4 percent glacial acetic acid in absolute ethanol is heated on a steam bath for 2 hours, cooled to room temperature and then filtered. The precipitate is dissolved in methylene chloride and passed through an acid silicate of magnesium column. The refluxing effluent is treated with hexane to crystallization. The product is collected and dried yielding 3.60 gm., melting point 173°–174°C. Anal. Calcd. for $C_{13}H_{14}N_2O_3$: C, 63.40; H, 5.73; N, 11.38. Found: C, 63.21; H, 5.83; N, 11.41.

EXAMPLE 2

Preparation of
3-[1-(5-Chloro-2-benzofuranyl)ethylidene]-carbazic acid ethyl ester A mixture of 1.94 gm. of 5-chloro-2-acetylbenzofuran, 1.04 gm. of ethyl carbazate and 1 drop of concentrated HCl in 25 ml. of 95 percent ethanol is heated on a steam bath for 1 hour, cooled and then filtered. The precipitate is dissolved in methylene chloride and passed through an acid silicate of mangesium column. The refluxing effluent is treated with hexane to crystallization. The product is collected and dried yielding 2.5 gm., melting point 202°–203°C. Anal. Calcd. for $C_{13}H_{13}ClN_2O_3$ C, 55.61; H, 4.66; Cl, 12.63; N, 9.98. Found: C, 56.06; H, 4.73; Cl, 12.39; N, 10.10.

We claim:

1. A compound of the formula:

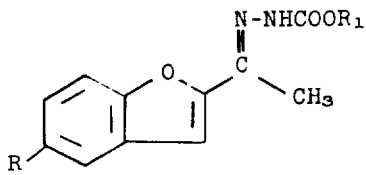

wherein R is selected from the group consisting of hydrogen and chlorine, and $R_1$ is alkyl $C_1$–$C_4$.

2. The compound according to claim 1, 3-[1-(2-benzofuranyl)ethylidene]-carbazic acid ethyl ester.

3. The compound according to claim 1, 3-[1-(5-chloro-2-benzofuranyl)ethylidene]-carbazic acid ethyl ester.

* * * * *